No. 844,790. PATENTED FEB. 19, 1907.
F. W. GARRETT.
SUPPORT FOR RAILWAY MOTOR CABLES.
APPLICATION FILED MAR. 6, 1905.
2 SHEETS—SHEET 1.
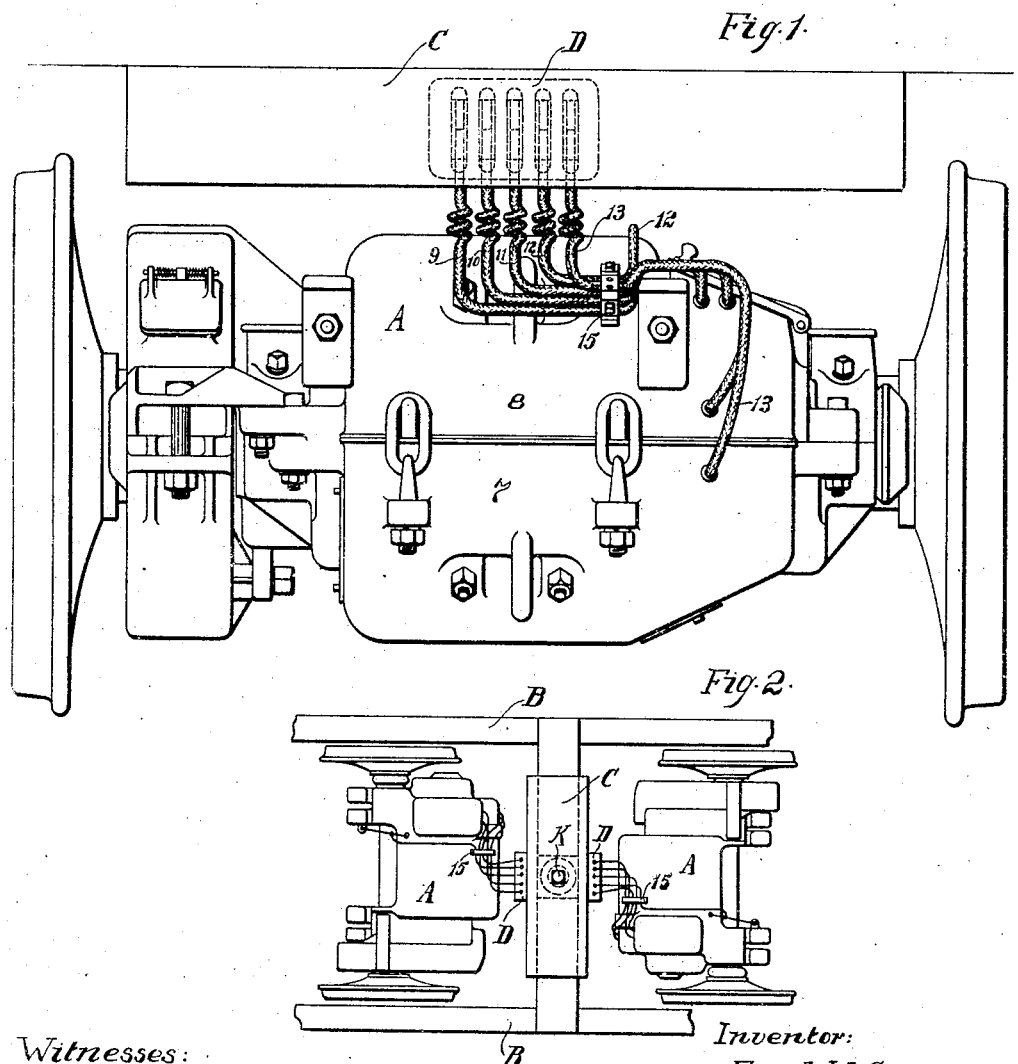
Witnesses:
George J. Schwartz.
Fred J. Kinsey
Inventor:
Frank W. Garrett.
By
Chas. E. Lord
Attorney.

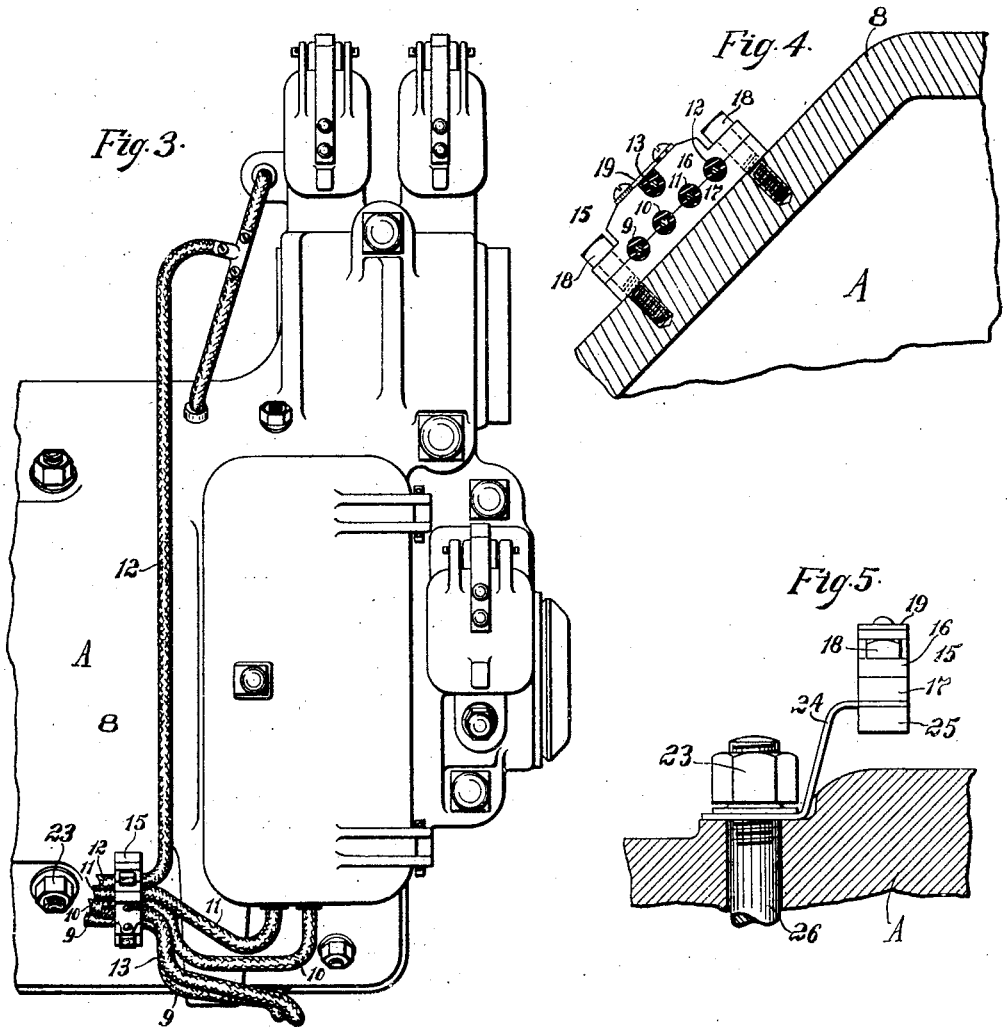

UNITED STATES PATENT OFFICE.

FRANK W. GARRETT, OF NORWOOD, OHIO, ASSIGNOR TO THE BULLOCK ELECTRIC MANUFACTURING COMPANY, A CORPORATION OF OHIO.

SUPPORT FOR RAILWAY MOTOR-CABLES.

No. 844,790.      Specification of Letters Patent.      Patented Feb. 19, 1907.

Application filed March 6, 1905. Serial No. 248,692.

*To all whom it may concern:*

Be it known that I, FRANK W. GARRETT, a citizen of the United States, residing at Norwood, in the county of Hamilton and State of Ohio, have invented certain new and useful Improvements in Supports for Railway Motor-Cables, of which the following is a full, clear, and exact specification.

My invention relates to electric railway-car equipment, and particularly to the means for supporting the cables leading from the car-motors.

At the present time it is customary in electric-railway work, especially on interurban roads, to employ cars having bogie or swiveled trucks with one or more motors mounted thereon. To permit proper play of the trucks on curves and switches, it has been heretofore considered necessary to allow a considerable length of cable between the car-body and the motors and to permit said cable to hang freely in long loops. This slack in the cable-leads to the motor is very objectionable, because there is great liability of said leads becoming damaged by striking against or being caught between the moving parts. Any material damage to these leads cripples the car, or at least part of its equipment.

The object of my invention is to reduce the liability of accident and damage to the electrical equipment of the car by supporting in a simple and efficient manner said cable-leads on the truck or motor as nearly as possible in vertical alinement with the king-bolt or center of the truck. This arrangement materially reduces the length of free cable necessary to permit proper play of the truck relative to the car.

In carrying out my invention I employ a support for the cables, as a cable-cleat, which is fastened to the motor-casing or to the truck-frame preferably approximately in vertical alinement with the king-bolt of the truck and to construct said cleat in such a manner that the cables may be readily removed therefrom. The cleat is also preferably constructed so that the cable or cables which lead to the lower half of the motor-casing may be removed from the cleat without disturbing the remaining cables in said cleat. Such a construction permits the motor-casing to be opened and the lower half to be swung away or otherwise removed from the upper half without unnecessary delay in disconnecting taped joints or in cutting leads.

In the accompanying drawings, which illustrate the preferred embodiment of the invention, Figure 1 is a diagrammatic view in elevation of a motor-truck looking from the center thereof, showing the cable-leads supported in accordance with my invention. Fig. 2 is a diagrammatic plan view of a bogie-truck, showing the preferred arrangement of cable-supports relative to the truck center. Fig. 3 is a plan view of part of the motor shown in Fig. 1. Fig. 4 is a side view of the cable-cleat, showing the preferred manner of attaching same to motor-casing. Fig. 5 is an end elevation of the cleat, showing a modified form of attaching means; and Fig. 6 is a plan view of the cleat.

Referring now to the drawings, the motor A is shown as divided, so that the lower half 7 can be removed from or swung downward on the upper half 8. The motor is mounted in the customary manner in the truck-frame B. The cable-leads from the field-coils and armature of the motor are shown at 9, 10, 11, 12, and 13. These cables leave the motor-casing at different points, and their terminals are fastened to the terminal box D, carried by the bolster C, which forms part of the car-body. It has been customary to permit these cable-leads to hang loosely between the terminal box and the points of egress from the motor-casing. This led to numerous difficulties and considerable damage to the electrical equipment of the car, due to said leads getting caught on or rubbing against moving parts of the truck or motor-casing. To avoid such difficulties and damage, I support the cable-leads in the cleat 15, mounted on the motor-casing or the car-truck, (here shown as mounted on the casing,) as nearly as possible in vertical alinement with the king-pin K, or center of the truck. This cleat is formed of two parts of wood or other insulating material 16 and 17, which are fastened together and to the motor-casing by means of the screws 18, as clearly shown in Fig. 4. The parts 16 and 17 are grooved to receive the cables 9, 10, 11, and 12, which lead from the upper half of the motor-casing. The upper part 16 of said cleat is also grooved to receive the cable 13, which leads from the lower half of the motor-casing. This latter cable must be disconnected from car-body when it is desired to remove the lower half of the motor for the purpose of inspecting the armature or for any other reason. To facilitate the removal of this lead from the cleat 15 without interfering with the support for the remaining leads, I provide a pivoted catch-plate 19. This catch-plate is pivoted at one end on the screw 20 and is provided with the slotted portion 22, which permits the opposite end of said plate to take under the head of screw 21, and thus hold cable 13 in its groove. When it becomes necessary to remove the lower half of the motor-casing, the cable 13 is removed from the cleat 15 by swinging plate 19 to one side, it being clear that said cable is readily removable from the terminal box D.

A modified form of support for the cleat 15 is shown in Fig. 5, said cleat being mounted upon a piece of sheet metal 24, bent into the shape shown in said figure, one end being clamped under the nut 23 on the bolt 26, which holds one of the motor pole-pieces in position, the upper end being fastened to the cleat between the extra strip 25 and the lower part 17.

I aim in the appended claims to cover all modifications and changes in the construction and arrangement of my improved cable-support which do not involve a departure from its spirit and scope.

Having thus described my invention, what I claim as new, and desire to secure by Letters Patent, is—

1. In combination, a car-body, a car-truck adapted to turn relative to said body, a motor on said truck, cable-leads between the motor and the car-body, and a support for said cable-leads movable with said truck and located approximately in vertical alinement with the king-pin of the truck.

2. In combination, a car-body, a car-truck adapted to turn relative to said body, a motor on said truck, cable-leads between the motor and car-body, and a cleat movable with said truck for supporting the cable-lead intermediate their ends.

3. In combination, a car-body, a car-truck adapted to turn relative to said body, a motor supported on said truck, cable-leads between the motor and the car-body, and means on said motor for supporting the cables intermediate their ends.

4. In combination, a car-body, a car-truck adapted to turn relative to said body, a motor supported on said truck, cable-leads between the motor and the car-body, and a support on the motor for the cables intermediate their ends, flexible portions of the latter being between the support and the car-body.

5. In combination, a car-body, a car-truck adapted to turn relative to said body, a motor on said truck, cable-leads between the motor and car-body, and a cleat movable with said truck for supporting the cable-leads intermediate their ends, and means whereby one of said cable-leads may be removed from the cleat without interfering with the remaining leads supported by said cleat.

6. In combination, a car-body, a car-truck adapted to turn relative to said body, a motor on said truck, cable-leads between the motor and car-body, and a cleat movable with said truck for supporting the cable-leads intermediate their ends, and means for fastening one of said leads to the cleat independent of the remainder of the leads so that said lead may be removed therefrom without interfering with the remainder of the leads.

7. In combination, a car-body, a car-truck adapted to turn relative to said body, a motor on said truck, cable-leads between the motor and car-body, and a cleat movable with said truck for supporting the cable-leads intermediate their ends, said motor having the lower half of its casing removable, and one of said cables leading from said lower half, and means for fastening said last-mentioned cable to said cleat independent of the remaining cables, so that said cable may be removed therefrom without disturbing the remaining cables when the lower half of the motor-casing is removed.

In testimony whereof I affix my signature in the presence of two witnesses.

FRANK W. GARRETT.

Witnesses:
LAURENT LOWENBERG,
FRED J. KINSEY.